(12) United States Patent
Lee et al.

(10) Patent No.: US 10,730,057 B2
(45) Date of Patent: Aug. 4, 2020

(54) MAGNETIC STRAINER

(71) Applicants: Sang Moo Lee, Seongnam-si (KR); Dae Ho Park, Namyangju-si (KR)

(72) Inventors: Sang Moo Lee, Seongnam-si (KR); Dae Ho Park, Namyangju-si (KR)

(*) Notice: Subject to any disclaimer, the term of this patent is extended or adjusted under 35 U.S.C. 154(b) by 78 days.

(21) Appl. No.: 16/253,573

(22) Filed: Jan. 22, 2019

(65) Prior Publication Data
US 2020/0129990 A1  Apr. 30, 2020

(30) Foreign Application Priority Data
Oct. 24, 2018  (KR) .................. 10-2018-0127212

(51) Int. Cl.
| | |
|---|---|
| *B03C 1/031* | (2006.01) |
| *E03B 7/07* | (2006.01) |
| *B01D 35/02* | (2006.01) |

(52) U.S. Cl.
CPC .............. *B03C 1/031* (2013.01); *B01D 35/02* (2013.01); *E03B 7/07* (2013.01)

(58) Field of Classification Search
CPC ....... B03C 1/284; B03C 1/031; B03C 1/0332; B03C 2201/18; B03C 2201/28; Y10T 137/8049; Y10T 137/794; Y10T 137/8122
USPC ........................................................ 210/223
See application file for complete search history.

(56) References Cited

U.S. PATENT DOCUMENTS

| | | | | |
|---|---|---|---|---|
| 2,310,586 A | * | 2/1943 | Lohman ................. | E03C 1/106 137/115.16 |
| 3,421,627 A | * | 1/1969 | Lammers ................ | B03C 1/282 210/131 |
| 4,883,591 A | * | 11/1989 | Belasco .................. | C02F 1/481 210/223 |
| 5,468,378 A | * | 11/1995 | de la Torre Barreiro ................... | C02F 1/481 210/192 |
| 5,851,386 A | * | 12/1998 | Paul ..................... | B01D 29/117 210/183 |
| 6,423,215 B1 | * | 7/2002 | Stein .................... | B01D 29/117 210/131 |
| 2002/0195383 A1 | * | 12/2002 | Caiozza ................ | B01D 35/06 210/223 |
| 2019/0314744 A1 | * | 10/2019 | Richter ................. | F16L 55/24 |

* cited by examiner

*Primary Examiner* — Reinaldo Sanchez-Medina
*Assistant Examiner* — Nicole Gardner
(74) *Attorney, Agent, or Firm* — Lex IP Meister, PLLC

(57) ABSTRACT

The present invention relates to a magnetic strainer that is configured to have a cap disposed in a filter insertion hole formed on the center of a branch pipe having an inlet and an outlet coupled to a pipe and to have upper and lower magnets arranged with repulsive forces, while placing a repulsive space therebetween, in such a manner as to be accommodated in both ends of a magnet case in a longitudinal direction of the magnet case to allow conductors in impurities to be easily collected to the inside of a filtering screen disposed between the filter insertion hole and the cap to filter the impurities, so that if ascending and descending means disposed under the magnet case operates, the upper magnet is descended to the repulsive space to easily remove the conductors collected on the top end surface of the magnet case.

4 Claims, 2 Drawing Sheets

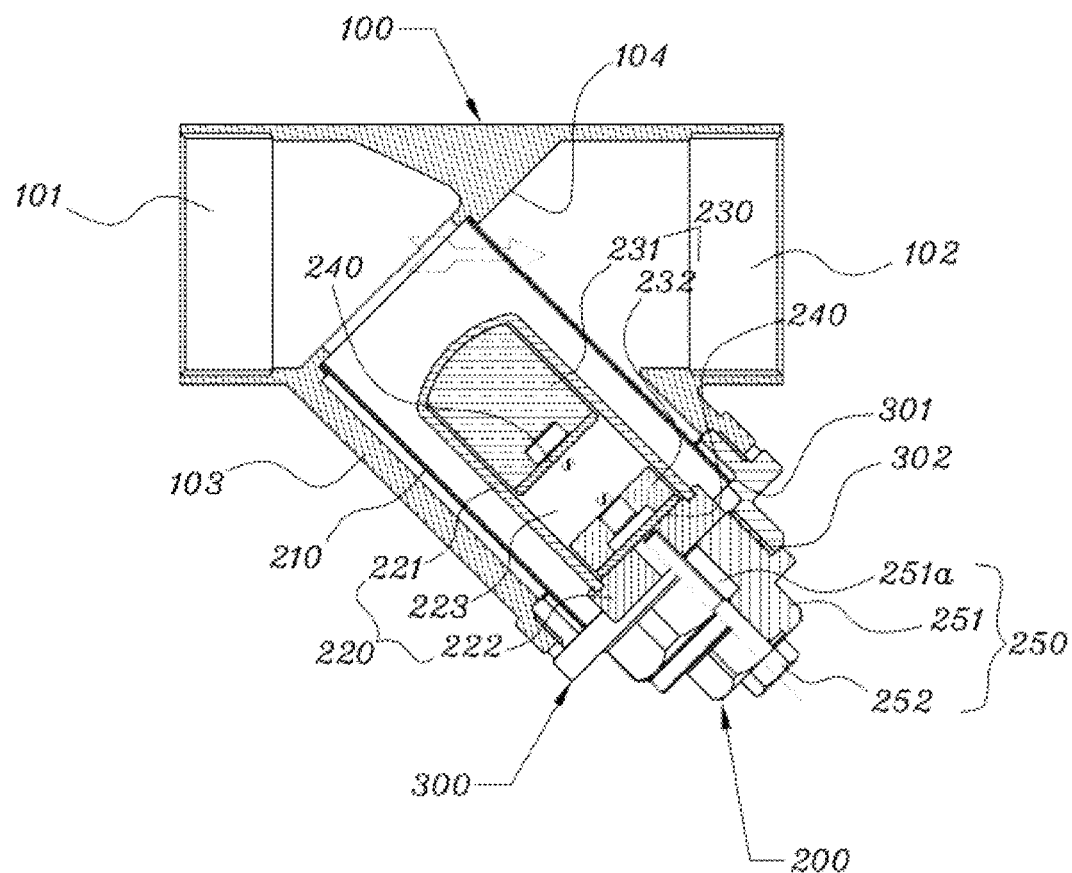
[FIG. 1]

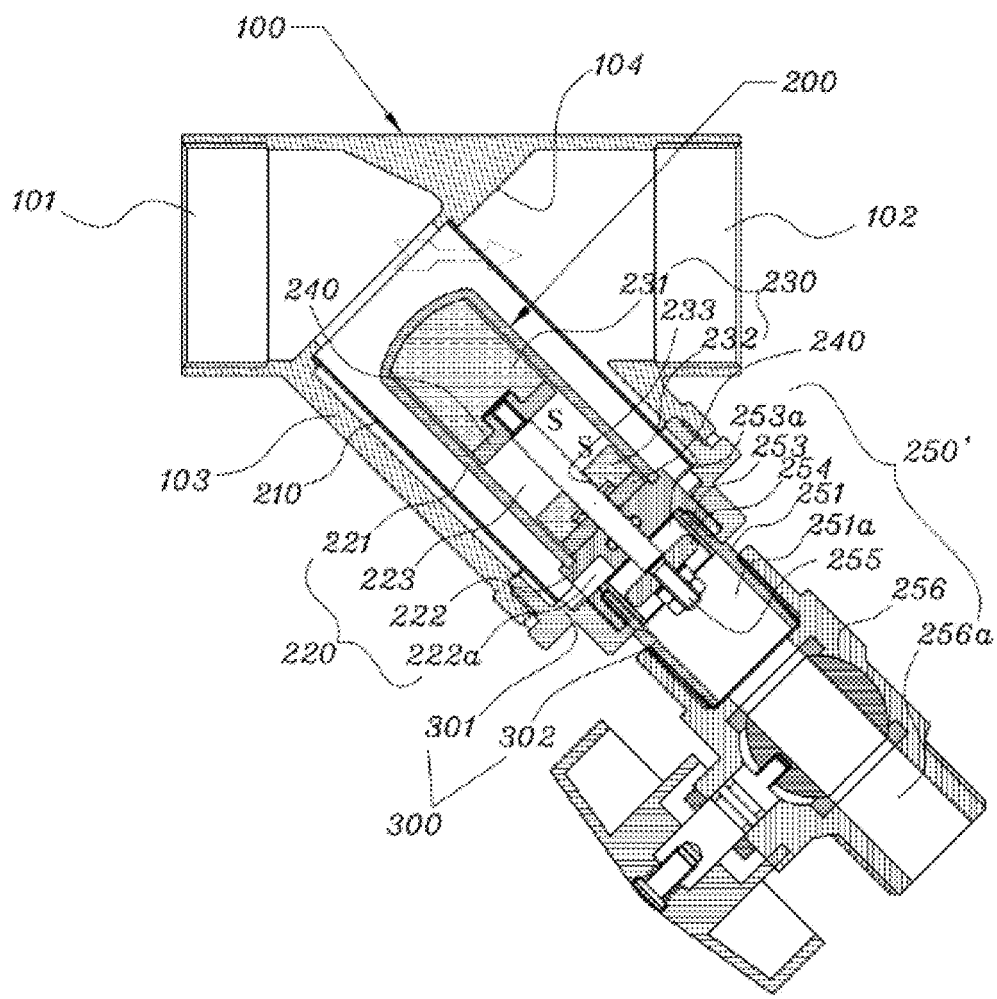
[FIG. 2]

MAGNETIC STRAINER

BACKGROUND OF THE INVENTION

Field of the Invention

The present invention relates to a magnetic strainer, and more particularly, to a magnetic strainer that is configured to have a cap disposed in a filter insertion hole formed on the center of a branch pipe having an inlet and an outlet coupled to a pipe and to have upper and lower magnets arranged with repulsive forces, while placing a repulsive space therebetween, in such a manner as to be accommodated in both ends of a magnet case in a longitudinal direction of the magnet case to allow conductors in impurities to be easily collected to the inside of a filtering screen disposed between the filter insertion hole and the cap to filter the impurities, so that if ascending and descending means disposed under the magnet case operates, the upper magnet is descended to the repulsive space to easily remove the conductors collected on the top end surface of the magnet case.

Background of the Related Art

On construction in which a pipe like a water pipe is newly built or the pipe is repaired, iron powder is necessarily generated, and rust occurs on an aged pipe. The iron powder and rust are naturally introduced in the pipe. After the completion of the construction, accordingly, water discharging has to be perfectly carried out to prevent foreign matters like the iron powder from staying in the pipe used.

By the way, the iron powder has a relatively high specific gravity of 7.83, and accordingly, it remains in a connection portion in the pipe. If water in the pipe flows, as a result, the iron powder flows up to important pipe components. In case of the water pipe, in detail, the iron powder is attached to a magnet part as a transmission medium of an indicating part through a rotation part of an impeller as an important part of a large-sized water meter, thereby causing measuring errors (slip). In some serious cases, the iron powder may be discharged even to a household tap.

In case of an industrial pipe, further, the iron powder gives damages to main components like a pump and a solenoid or causes their failure, and besides, a quality of water becomes bad due to rusty water.

By these reasons, generally, strainers as filter devices are disposed on arbitrary positions of the pipe to filter the foreign matters contained in a fluid flowing in the pipe.

A conventional strainer has a shape of 'Y' in such a manner as to have an inlet in which a fluid is introduced, a filter insertion hole formed on the center thereof to allow foreign matters to be filtered from the fluid introduced in the inlet through a filtering screen, and an outlet for discharging the fluid passing through the filtering screen, and in this case, the strainer is formed unitarily with the inlet, the filter insertion hole, and the outlet. Under the above configuration of the strainer, the cylindrical filtering screen having a plurality of through holes is disposed in the filter insertion hole between the inlet and the outlet to allow the fluid introduced in the inlet to pass therethrough, so that after foreign matters like iron oxide or fine suspended solids contained in the fluid are filtered, the fluid from which the foreign matters are filtered is discharged to the outlet and thus supplied to the rear side of the pipe, thereby preventing operating equipment such as a valve or motor installed on the rear side of the pipe from being malfunctioned due to attachment of the foreign matters thereto.

Examples of the conventional strainers are disclosed in Korean Utility Model Application Laid-open No. 20-1989-0012723 (on Aug. 7, 1989) entitled 'strainer device' and Korean Patent No. 10-1195200 (on Oct. 22, 2012) entitled 'magnetic strainer for water pipe'. According to the conventional strainers, by the way, one long magnet is inserted into the filter insertion hole, and otherwise, a plurality of magnets, which come into close contact with each other in a row, are insertedly disposed on a support stand.

So as to protect a water meter from the foreign matters introduced in the water pipe due to various water supply facility construction, in addition, a strainer is installed on the front end of a large-sized water meter.

Examples of such conventional strainers are disclosed in Korean Patent No. 10-0919282 (on Sep. 21, 2009) entitled 'corrosion prevention pipe', Korean Patent No. 10-0919816 (on Sep. 24, 2009) entitled 'strainer for water meter', Korean Patent No. 10-0485303 (on Apr. 15, 2005) entitled 'strainer for water pipe', and Korean Utility Model Application Laid-open No. 20-2009-0004835 (on May 20, 2009) entitled 'strainer for water meter'. By the way, the prior arts just describe technologies for filtering foreign matters, but do not mention any technology for collecting fine iron powder functioning as trouble factors of a large-sized water meter and pipe components before the iron power is introduced in the large-sized water meter and the pipe components. Therefore, there is a need to develop a new technology for in advance collecting the fine iron powder before the iron power is introduced in the pipe components, thereby basically blocking the supply of the iron powder to protect the pipe components from the iron powder.

SUMMARY OF THE INVENTION

Accordingly, the present invention has been made in view of the above-mentioned problems occurring in the prior art, and it is an object of the present invention to provide a magnetic strainer that is more economical and simple in configuration and has abundant technology diversity.

It is another object of the present invention to provide a magnetic strainer that basically prevents conductors like iron powder from being introduced in pipe components by means of magnetic forces of magnets, thereby maintaining the performance of the pipe components, extending their life span, and reducing their failure rate.

It is yet another object of the present invention to provide a magnetic strainer that easily discharges conductors attached to magnets of a filter member from a filter insertion hole through a discharge hole or easily separates the filter member to conveniently remove the conductors collected on the magnets.

To accomplish the above-mentioned objects, according to the present invention, there is provided a magnetic strainer disposed on a line of a pipe to filter foreign matters contained in the pipe, including: a branch pipe having an inlet and an outlet formed on both ends thereof and a filter insertion hole formed unitarily on the center thereof; a filter member inserted into the filter insertion hole in a longitudinal direction thereof and having a magnet part adapted to collect conductors; and a cap screw-fastened to the filter insertion hole of the branch pipe, wherein the filter member includes: a filtering screen whose one end is lockedly supported against a circular locking projection formed in the middle portion of the interior of the branch pipe and whose other end is lockedly and fixedly supported against a circular supporting projection formed along the inner edge periphery of the cap; a magnet case disposed accommodatedly inside the filtering screen and having an upper magnet case and a lower magnet case separably coupled to each other; the magnet part disposed inside the internal space of the magnet case and having an upper magnet and a lower magnet arranged with repulsive forces in such a manner as to come into contact with the top and bottom ends of the internal space of the magnet case to collect the conductors on the surface of the magnet case; shield steel plates coupled to the underside surfaces of the upper magnet and the lower magnet; and ascending and descending means coupled retractably to a coupling hole formed at the center of the bottom surface of the cap and shaft-coupled to the magnet part or the magnet case in such a manner as to allow the upper magnet coming into close contact with the top end of the magnet case to be descended, whereby at the time of cleaning, the ascending and descending means is descended to allow the upper magnet to be descended, and an amount of magnetic force transferred to the conductors collected on the top end surface of the magnet case is reduced, so that the conductors collected on the top end surface of the magnet case are removed.

According to the present invention, desirably, the ascending and descending means includes: a connector coupled to the coupling hole of the cap and having a through hole formed at the center thereof; and a set bolt whose one end is passed through the through hole and is then coupled to the magnet case and whose other end is shaft-coupled to the bottom end of the connector.

According to the present invention, desirably, a width of the magnet case is smaller than a width of the coupling hole of the cap, so that the connector is separated, without any separation of the cap fixedly supporting the filtering screen on the interior of the branch pipe, to allow the magnet case to be drawn to the outside through the coupling hole of the cap to remove the conductors collected on the magnet case.

According to the present invention, desirably, the ascending and descending means includes: a connector whose one end is passed through the coupling hole of the cap and is then coupled to the lower magnet case and having a through hole formed at the center thereof; a sleeve having a discharge hole formed penetratedly on the center thereof in such a manner as to be coupled to a top inner periphery of the through hole of the connector; a piston disposed ascendably and descendably along the sleeve; a shaft rod whose one end is passed through the lower magnet having a through hole formed at the center thereof and is then coupled to the underside of the upper magnet and whose other end is shaft-coupled to the bottom end of the piston by means of nuts; and a ball valve coupled to the other end of the connector to discharge a fluid in the pipe to the outside through a discharge hole, wherein the lower magnet case has a discharge hole formed on one side periphery thereof in such a manner as to be connected to the discharge hole of the sleeve, and if the ball valve is open to transfer the pressure in the pipe to the discharge hole of the sleeve through the discharge hole of the lower magnet case, the piston, which closes the discharge hole of the sleeve, is descended by means of the transferred pressure to allow the discharge hole to be open, so that the fluid is discharged to the discharge hole of the ball valve, and the upper magnet is descended to the repulsive space to allow an amount of magnetic force transferred to the conductors collected on the top end surface of the upper magnet case to be reduced to discharge the conductors collected on the top end surface of the upper magnet case to the outside through the discharge hole by means of the discharge pressure of the fluid discharged through the discharge hole.

BRIEF DESCRIPTION OF THE DRAWINGS

The above and other objects, features and advantages of the present invention will be apparent from the following detailed description of the preferred embodiments of the invention in conjunction with the accompanying drawings, in which:

FIG. 1 is a sectional view showing a magnetic strainer according to a first embodiment of the present invention; and FIG. 2 is a sectional view showing a magnetic strainer according to a second embodiment of the present invention.

DETAILED DESCRIPTION OF THE PREFERRED EMBODIMENTS

Hereinafter, an explanation on a magnetic strainer according to the present invention will be in detail given with reference to the attached drawings.

According to the present invention, the magnetic strainer is used in various kinds of pipes such as water pipes, boiler pipes, and so on, and especially, if the magnetic strainer is used in an old rotted pipe, it can effectively collect and discharge rust flowing along the pipe. The features of the present invention are as follows.

As shown in FIGS. 1 and 2, the magnetic strainer 1 according to the present invention includes an 'Y'-shaped branch pipe 100 disposed on a line of a pipe and having an inlet 101 and an outlet 102 formed on both ends thereof and a filter insertion hole 103 formed unitarily on the center thereof, a cap 300 screw-fastened to the filter insertion hole 103 of the branch pipe 100, and a filter member 200 disposed in the filter insertion hole 103 in such a manner as to be coupled to the cap 300.

According to the present invention, if it is assumed that a diameter of the pipe is one inch, a water pressure in the line of the pipe is 4.0 MPa, a flow rate therein is 60 to L/min, and a flow velocity is 1.8 m·sec. Under such environments, hereinafter, the present invention will be explained. However, such environments are suggested to easily describe the present invention, and therefore, the present invention is not limited particularly thereto.

The 'Y'-shaped branch pipe 100 includes the inlet 101 and the outlet 102 formed on both ends thereof, the filter insertion hole 103 formed unitarily on the center thereof, and a circular locking projection 104 formed in the middle portion of the interior thereof.

Further, the cap 300 includes a circular supporting projection 301 formed along the inner edge periphery along which an inner space thereof is formed and a coupling hole 302 penetratedly formed at the center of the bottom surface thereof in such a manner as to be connected to the inner space thereof.

The filter member 200, as a main component of the present invention, includes a filtering screen 210 disposed inside the filter insertion hole 103 of the branch pipe 100, a magnet part 230 disposed inside the filtering screen 210 and having upper and lower magnets 231 and 232 as will be discussed later arranged with repulsive forces, while placing a repulsive space 223 therebetween, a magnet case 220 for accommodating the magnet part 230, and ascending and descending means 250 or 250' for ascending the upper magnet 231 to the repulsive space 223.

The filtering screen 210, which is a cylindrical screen body, is configured to allow one end thereof in a longitudinal direction thereof to be lockedly supported against the circular locking projection 104 formed in the middle portion of the interior of the branch pipe 100 and to allow the other end thereof in the longitudinal direction thereof to be lockedly and fixedly supported against the circular supporting projection 301 of the cap 300. In this case, as shown in FIGS. 1 and 2, the circular locking projection 104 and/or the circular supporting projection 301 are provided to the form of protruding ends, and of course, they may be provided to the form of circular grooves (not shown).

The magnet case 220 is disposed accommodatedly inside the filtering screen 210. The magnet case 220 includes an upper magnet case 221 and a lower magnet case 222, and the upper magnet case 221 and the lower magnet case 222 are separably coupled to each other to form an internal space therein.

Desirably, the magnet case 220 is a non-conductor. Further, the top end surface of the upper magnet case 221 is desirably curved outwardly and convexedly so as to expand a surface area thereof.

Also, the magnet part 230 is disposed inside the internal space of the magnet case 220 and has the upper magnet 231 and the lower magnet 232 arranged with repulsive forces in such a manner as to come into contact with the top and bottom ends of the internal space of the magnet case 220. In detail, the repulsive space 223 is formed between the inner sides of the upper and lower magnets 231 and 232 facing each other by means of the repulsive forces between the upper and lower magnets 231 and 232, and the outer sides of the upper and lower magnets 231 and 232 are brought into close contact with the top and bottom inner surfaces of the magnet case 220 in the longitudinal direction of the magnet case 220. In this case, of course, a length of the repulsive space 223 formed by means of the repulsive forces between the upper and lower magnets 231 and 232 is calculated, and a length of the magnet case 220 is then determined in such a manner as to allow the upper and lower magnets 231 and 232 to come into close contact with both ends of the magnet case 220.

In this case, since the top end surface of the upper magnet case 221 is curved outwardly and convexedly, the top end surface of the upper magnet 231 is desirably curved outwardly and convexedly in such a manner as to correspond to the top end surface of the upper magnet case 221. As a result, the surface areas on the top end surfaces of the upper magnet case 221 and the upper magnet 231 can be expanded to the maximum. If so, a quantity of conductors collected on the top end surface of the upper magnet case 221 can be increased to achieve efficient collection.

Further, shield steel plates 240 are coupled to the underside surfaces of the upper and lower magnets 231 and 232 of the magnet part 230. As the shield steel plates 240 are disposed on the underside surfaces of the upper and lower magnets 231 and 232, accordingly, attractive forces are generated between the upper and lower magnets 231 and 232 arranged with the repulsive forces by means of the shield steel plates 240. As the lower magnet 232 is descended by the operation of the ascending and descending means 250 or 250' as will be discussed later, the attractive forces are applied to the upper magnet 231, and the upper magnet 231 is descended together with the lower magnet 232.

In designing the magnet part 230 and the shield steel plates 240, besides, a magnetic force of the upper magnet 231 is stronger by two or three times than a magnetic force of the lower magnet 232. Desirably, the shield steel plate 240 is coupled to the underside surface of the upper magnet 231 to allow the magnetic force of 6,000 Gs to be focused on the curved top end surface of the magnetic case 220, and the lower magnet 232 whose underside surface is coupled to the shield steel plate 240 has the magnetic force of 2,500 Gs. In this case, even if the magnetic force on the curved top end surface of the magnetic case 220 is 6,000 Gs, the magnetic forces the sides and bottom of the magnetic case 220 are 300 to 600 Gs relatively smaller than the magnetic force on the curved top end surface thereof. Accordingly, conductors as iron waste collectively gather on the curved top end surface of the magnet case 220 having the strongest magnetic force.

So as to remove or discharge the conductors collectively gathering on the curved top end surface of the magnet case 220, on the other hand, there is a need to suppress the magnetic force from being collected onto the curved top end surface of the magnet case 220. According to the present invention, a method for suppressing the magnetic force from being collected onto the curved top end surface of the magnet case 220 is carried out by connecting the upper magnet 231 to the ascending and descending means 250 or 250', descending the upper magnet 231 to the repulsive space 223 by means of the descending operation of the ascending and descending means 250 or 250', and allowing the top end surface of the upper magnet 231 to be spaced apart from the inner top end surface of the magnet case 220.

First, the ascending and descending means 250 is configured as shown in FIG. 1.

According to the first embodiment of the present invention, the ascending and descending means 250 includes a connector 251 whose outer periphery is coupled to the coupling hole 302 of the cap 300 and a set bolt 252 whose one end is passed through a through hole 251a formed at the center of the connector 251 and is then coupled to the lower magnet case 222 and whose other end is shaft-coupled to the bottom end of the connector 251.

Under the above configuration, a width of the magnet case 220 is desirably smaller than a width of the coupling hole 302 of the cap 300. In this case, if it is desired to remove the conductors collected in the magnet case 220, only the connector 251 is separated, without any separation of the cap 300 from the filter insertion hole 103, so that iron waste collected on the outer surface of the magnet case 220 can be easily removed.

The configuration of the ascending and descending means 250 has an advantage in that the cap 300 fixedly supporting the filtering screen 210 on the interior of the branch pipe 100 does not need to be separated. As shown in FIG. 1, the filter insertion hole 103 has an inclination angle of 45° with respect to the branch pipe 100. Accordingly, the ascending and descending means 250 is also coupled to the filter insertion hole 103 at the inclination angle of 45°, and the filtering screen 210 is also fixedly supported on the interior of the branch pipe 100 by means of the cap 300 at the inclination angle of 45°. The filtering screen 210 is a thin cylindrical screen body, and if it is re-coupled after separated for cleaning, it may be easily likely to be damaged. Besides, it is actually hard to fixedly locate the filtering screen 210 between the circular locking projection 104 in the interior of the branch pipe 100 and the circular supporting projection 301 of the cap 300. Accordingly, it is desirable to separate the filtering screen 210 so as to remove the iron waste, but if the ascending and descending means 250 as shown in FIG. 1 is used, the above-mentioned problems can be simply solved.

On the other hand, the ascending and descending means 250' is configured as shown in FIG. 2.

First, the ascending and descending means 250' includes a connector 251 having a through hole 251a formed on the center thereof in such a manner as to allow one end thereof to be passed through the coupling hole 302 of the cap 300 and then coupled to the lower magnet case 222.

Further, the ascending and descending means 250' includes a sleeve 253 having a discharge hole 253a formed penetratedly on the center thereof in such a manner as to be coupled to a top inner periphery of the through hole 251a of the connector 251. In this case, the sleeve 253 becomes desirably enlarged in width as it goes toward the lower periphery thereof. Such configuration of the sleeve 253 allows a piston 254 to be disposed ascendably and descendably along the sleeve 253. If the sleeve 253 becomes enlarged in width as it goes toward the lower periphery thereof, the piston 254 sliding along the sleeve 253 is fitted to the top inner periphery of the sleeve 253 and thus closes the sleeve 253 naturally. If the fluid in the sleeve 253 is discharged to the outside by means of an operation of a ball valve 256 as will be discussed later, the piston 254 moves to the relatively large lower inner periphery of the sleeve 253 by means of the discharge pressure of the fluid in the sleeve 253, thereby ensuring a space in which the fluid is discharged. In this case, the fluid is discharged from the narrow top space to the wide bottom space at a time, thereby advantageously increasing the discharge pressure of the fluid.

Further, the ascending and descending means 250' includes a shaft rod 255 whose one end is passed through the lower magnet 232 having a through hole 233 formed at the center thereof and is then coupled to the underside of the upper magnet 231 and whose other end is shaft-coupled to the bottom end of the piston 254 by means of nuts.

Further, the ascending and descending means 250' includes the ball valve 256 coupled to the other end of the connector 251 to discharge the fluid in the pipe to the outside through a discharge hole 256a. Under the above-mentioned configuration, the lower magnet case 222 has a discharge hole 222a formed on one side periphery thereof in such a manner as to be connected to the discharge hole 253a of the sleeve 253.

Under the configuration of the ascending and descending means 250', if the ball valve 256 is open, the pressure in the pipe is transferred to the discharge hole 253a of the sleeve 253 through the discharge hole 222a of the lower magnet case 222, and the piston 254, which closes the discharge hole 253a of the sleeve 253, is descended by means of the transferred pressure to allow the discharge hole 253a to be open, so that the fluid is discharged to the discharge hole 256a of the ball valve 256 and the upper magnet 231 is descended to the repulsive space 223. Accordingly, an amount of magnetic force transferred to the conductors collected on the top end surface of the upper magnet case 221 is reduced so that the conductors collected on the top end surface of the upper magnet case 221 are gently discharged to the outside through the discharge hole 256a by means of the discharge pressure of the fluid discharged through the discharge hole 256a.

As described above, the magnetic strainer according to the present invention can basically prevent the conductors from being introduced in pipe components like a meter, a pump, and a solenoid by means of the magnetic forces of the magnets, thereby maintaining the performance of the pipe components, extending their life span, reducing their failure rate, and allowing clean and fresh water from which rusty water is removed to be supplied through filtering of foreign matters inclusive of the conductors.

According to the biggest features of the present invention, in addition, the cap is disposed in the filter insertion hole formed on the center of the branch pipe having the inlet and the outlet installed on the pipe, and the upper and lower magnets arranged with repulsive forces by placing the repulsive space therebetween are accommodated in both ends of the magnet case in the longitudinal direction of the magnet case in such a manner as to allow the conductors in the impurities to be easily collected to the inside of the filtering screen disposed inside the filter insertion hole to filter the impurities, so that if the ascending and descending means disposed under the magnet case operates, the upper magnet is descended to the repulsive space to easily remove the conductors collected on the top end surface of the magnet case.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

What is claimed is:

1. A magnetic strainer disposed on a line of a pipe to filter foreign matters contained in the pipe, comprising:
    a branch pipe (100) having an inlet (101) and an outlet (102) formed on both ends thereof and a filter insertion hole (103) formed unitarily on the center thereof;
    a filter member (200) inserted into the filter insertion hole (103) in a longitudinal direction thereof and having a magnet part (230) adapted to collect conductors; and
    a cap (300) screw-fastened to the filter insertion hole (103) of the branch pipe (100),
    wherein the filter member (200) comprises:
    a filtering screen (210) whose one end is lockedly supported against a circular locking projection (104) formed in the middle portion of the interior of the branch pipe (100) and whose other end is lockedly and fixedly supported against a circular supporting projection (301) formed along the inner edge periphery of the cap (300);
    a magnet case (220) disposed accommodatedly inside the filtering screen (210) and having an upper magnet case (221) and a lower magnet case (222) separably coupled to each other;
    the magnet part (230) disposed inside the internal space of the magnet case (220) and having an upper magnet (231) and a lower magnet (232) arranged with repulsive forces in such a manner as to come into contact with the top and bottom ends of the internal space of the magnet case (220) to collect the conductors on the surface of the magnet case (220);
    shield steel plates (240) coupled to the underside surfaces of the upper magnet (231) and the lower magnet (232); and
    ascending and descending means (250 or 250') coupled retractably to a coupling hole (302) formed at the center of the bottom surface of the cap (300) and shaft-coupled to the magnet part (230) or the magnet case (220) in such a manner as to allow the upper magnet (231) coming into close contact with the top end of the magnet case (220) to be descended,
    whereby at the time of cleaning, the ascending and descending means (250 or 250') is descended to allow the upper magnet (231) to be descended, and an amount of magnetic force transferred to the conductors collected on the top end surface of the magnet case (220) is reduced, so that the conductors collected on the top end surface of the magnet case (220) are removed.

2. The magnetic strainer according to claim 1, wherein the ascending and descending means (250) comprises:

a connector (251) coupled to the coupling hole (302) of the cap (300) and having a through hole 251*a* formed at the center thereof; and a set bolt (252) whose one end is passed through the through hole (251*a*) and is then coupled to the magnet case (220) and whose other end is shaft-coupled to the bottom end of the connector (251).

3. The magnetic strainer according to claim 2, wherein a width of the magnet case (220) is smaller than a width of the coupling hole (302) of the cap (300), so that the connector (251) is separated, without any separation of the cap (300) fixedly supporting the filtering screen (210) on the interior of the branch pipe (100), to allow the magnet case (220) to be drawn to the outside through the coupling hole (302) of the cap (300) to remove the conductors collected on the magnet case (220).

4. The magnetic strainer according to claim 1, wherein the ascending and descending means (250') comprises:

a connector (251) whose one end is passed through the coupling hole (302) of the cap (300) and is then coupled to the lower magnet case (222) and having a through hole (251*a*) formed at the center thereof;

a sleeve (253) having a discharge hole (253*a*) formed penetratedly on the center thereof in such a manner as to be coupled to a top inner periphery of the through hole (251*a*) of the connector (251);

a piston (254) disposed ascendably and descendably along the sleeve (253);

a shaft rod (255) whose one end is passed through the lower magnet (232) having a through hole (233) formed at the center thereof and is then coupled to the underside of the upper magnet (231) and whose other end is shaft-coupled to the bottom end of the piston (254) by means of nuts; and a ball valve (256) coupled to the other end of the connector (251) to discharge a fluid in the pipe to the outside through a discharge hole (256*a*), wherein the lower magnet case (222) has a discharge hole (222*a*) formed on one side periphery thereof in such a manner as to be connected to the discharge hole (253*a*) of the sleeve (253), and if the ball valve (256) is open to transfer the pressure in the pipe to the discharge hole (253*a*) of the sleeve (253) through the discharge hole (222*a*) of the lower magnet case (222), the piston (254), which closes the discharge hole (253*a*) of the sleeve (253), is descended by means of the transferred pressure to allow the discharge hole (253*a*) to be open, so that the fluid is discharged to the discharge hole (256*a*) of the ball valve (256), and the upper magnet (231) is descended to the repulsive space (223) to allow an amount of magnetic force transferred to the conductors collected on the top end surface of the upper magnet case (221) to be reduced to discharge the conductors collected on the top end surface of the upper magnet case (221) to the outside through the discharge hole (256*a*) by means of the discharge pressure of the fluid discharged through the discharge hole (256*a*).

* * * * *